United States Patent [19]
Cunningham et al.

[11] 3,729,899
[45] May 1, 1973

[54] RECOVERY OF ETHYLENE OXIDE FROM ADMIXED INERT GASEOUS COMPONENTS

[75] Inventors: Jack W. Cunningham, Oakland, E. Gordon Foster, Emeryville, Robert G. Vanderwater, El Cerito, all of Calif.

[73] Assignee: Shell Oil Company, New York, N.Y.

[22] Filed: June 23, 1971

[21] Appl. No.: 155,959

[52] U.S. Cl. ............................................. 55/44, 55/51
[51] Int. Cl. .............................................. B01d 19/00
[58] Field of Search ..................... 55/44, 48, 51, 68, 55/55, 84, 89; 260/348.5

[56] References Cited

UNITED STATES PATENTS 3,165,539   1/1965   Lutz ........................................ 55/51
3,174,262   3/1965   Lutz ........................................ 55/51
3,217,466   11/1965  Bogart ..................................... 55/55

*Primary Examiner*—Charles N. Hart
*Attorney*—Howard W. Haworth et al.

[57] ABSTRACT

Ethylene oxide is separated from admixed inert gaseous components and recovered as a gaseous fraction by (a) contacting the gaseous mixture with a lean aqueous absorbant to produce an ethylene oxide-rich absorbate; (b) flashing the ethylene oxide-rich absorbate at a temperature below about 65° C to produce a condensate lean in inerts; and (c) contacting, in an ethylene oxide stripping zone, the inerts-lean condensate with a stripping vapor at or slightly above atmospheric pressure to produce a gaseous overhead rich in ethylene oxide.

6 Claims, 1 Drawing Figure

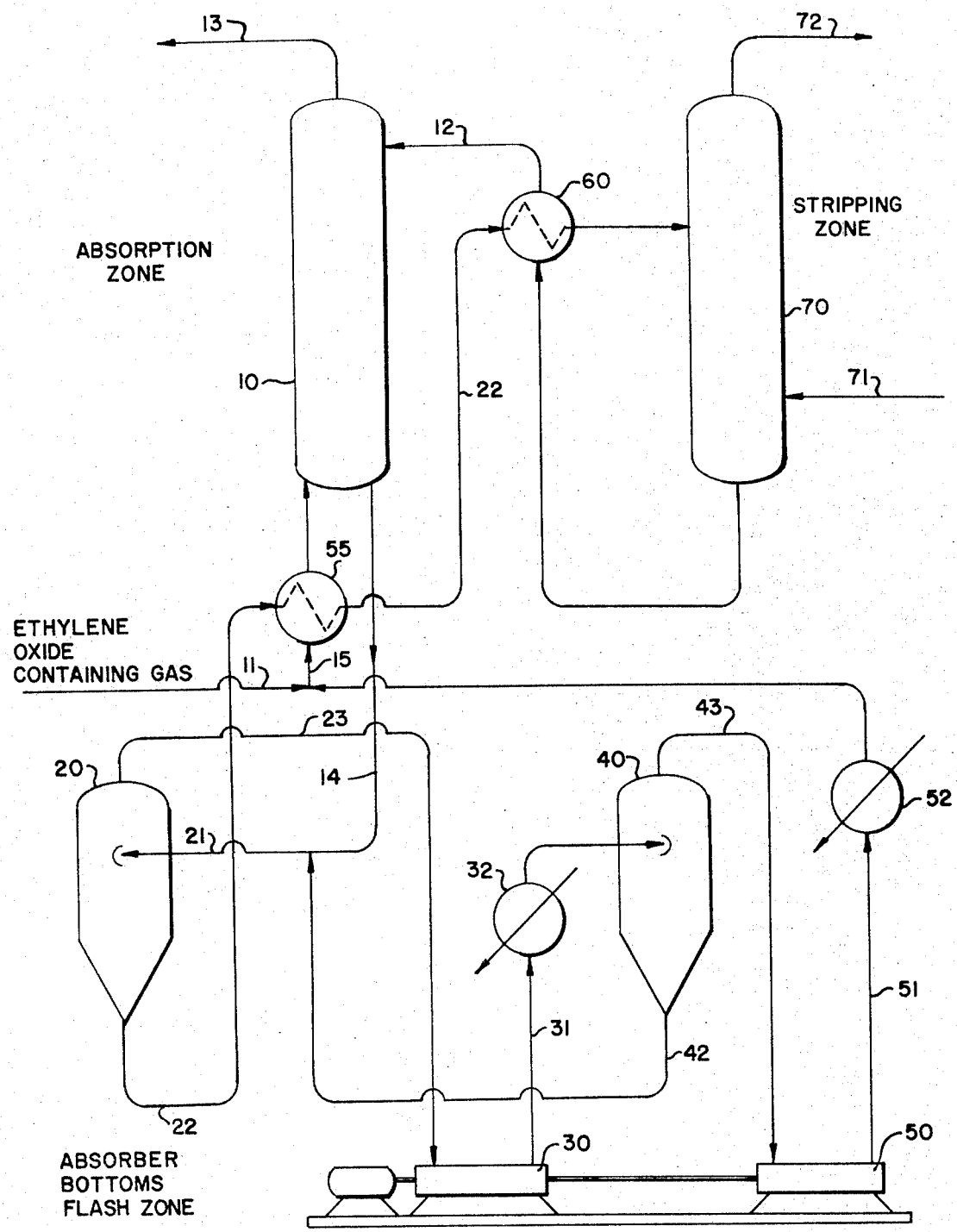

RECOVERY OF ETHYLENE OXIDE FROM ADMIXED INERT GASEOUS COMPONENTS

BACKGROUND OF THE INVENTION

This invention relates to the recovery of ethylene oxide from mixtures which contain carbon dioxide, low molecular weight hydrocarbons, and other inert materials. More particularly, it deals with recovery of ethylene oxide, such as is prepared by the silver-catalyzed oxidation of ethylene, from mixtures with inert reaction mixture components. Specifically, a processing sequence is disclosed which permits recovery of ethylene oxide, as a gaseous fraction, while (1) minimizing yield losses to ethylene glycols by hydrolysis and (2) avoiding the dangers of compressing gaseous streams containing a high proportion of ethylene oxide.

THE PRIOR ART

On an industrial scale ethylene oxide is generally manufactured by the silver-catalyzed oxidation of ethylene. The effluent from the oxidation reactor will contain relatively small quantities of ethylene oxide in admixture with relatively large amounts of unconverted ethylene and oxygen as well as appreciable quantities of other inert materials, such as carbon dioxide, low molecular weight hydrocarbons and fixed gases like argon and nitrogen. The conventional technique for recovering ethylene oxide from such mixtures is to first absorb the ethylene oxide in a lean aqueous absorbant and then, process the fat absorbant in one or more of a variety of ways, including fractionation, scrubbing, and stripping, to recover the ethylene oxide.

One of the major problems encountered by processes of the prior art, but rarely referred to, is the hydrolysis of ethylene oxide to ethylene glycol, diethylene glycol, and higher glycols. Formation of the indicated polyols occurs in the ethylene oxide-rich absorbate when the ethylene oxide is stripped from the absorbate in which it is initially dissolved. This hydrolysis occurs because of the hold-up of ethylene oxide and water in the feed piping and on trays in the stripping zone, which is conventionally operated at elevated temperatures.

In terms of the temperature and pressure maintained within the stripping zone, a serious operating dilemma exists. On the one hand, the pressure maintained within the stripping zone should be above atmospheric; otherwise, air may be drawn into the system and thus create potentially flammable mixtures of ethylene oxide, hydrocarbons, and oxygen. A critical consequence of operating the stripping zone at low pressure, i.e., 15 to about 35 psia, is the extreme difficulty in, or outright impossibility of, condensing the stripping zone overhead with cooling water. Inert gases co-absorbed with the ethylene oxide end up in the stripping zone overhead and make it difficult to achieve essentially complete condensation of the ethylene oxide contained therein. On the other hand, if the pressure at which the stripping zone operates is increased too much above atmospheric, with concomitant increase in operating temperature, the amount of ethylene oxide lost to glycols by hydrolysis is greatly increased. Such hydrolysis products are of a very complex and impure nature. Considerable processing equipment, expensive to install, operate, and maintain, must be employed to separate and recover these glycols as salable commodities.

In the past, it has been conventional to operate the stripping zone at a pressure of about 30 to about 65 psia to enable condensation of the overhead vapor by indirect heat exchange with ordinary cooling water. Under such conditions, small but significant yield losses of ethylene oxide to glycols via hydrolysis have been tolerated. Such yield losses may be reduced by operating the stripping zone at a lower pressure and condensing the overhead product by refrigeration. However, the cost of refrigeration in such a processing sequence tends to offset the benefit of higher yields to ethylene oxide.

Another solution to the problem of minimizing ethylene oxide yield losses while simultaneously effecting condensation of the stripping zone overhead with ordinary cooling water is to operate the stripping zone at slightly above atmospheric pressure and to compress the overheaded vapor before carrying out the condensation. Unfortunately, such a solution suffers from two drawbacks: one of economics, and one of safety. Compression equipment generally involves large capital expenditures, and usually necessitates high operating and maintenance costs. From a safety standpoint, compression of gaseous overhead from a conventional stripping zone, which generally contains at least 25 mole percent ethylene oxide, and may contain as much as 80-90 mole percent ethylene oxide, involves subjecting a thermally- and pressure-sensitive mixture to conditions which may result in its explosive decomposition. While a number of commercial ethylene oxide plants have circumvented the above-indicated problem by compression and ordinary cooling water-induced condensation of the stripping zone overhead without catastrophic incident, a certain risk nevertheless remains by operation in such a manner.

Lutz, U.S. Pat. No. 3,165,539 (issued Jan. 12, 1965) advances an alternative solution to the above-indicated stripping zone operating dilemma. An aqueous, ethylene oxide absorbate, produced by water scrubbing of gaseous, oxidation reactor effluent, is flashed at a temperature of 75° to 110° C. Condensate from the flashing is stripped at a pressure generally within the range of 5 to 30 psia, and in an example at 9 psia, to produce a gaseous overhead containing a high concentration of ethylene oxide in admixture with inerts and steam. The ethylene oxide-rich, stripping zone tops are then compressed prior to final distillations for purifying product ethylene oxide. Such a processing sequence suffers from at least three serious economic and safety deficiencies; the high temperature of the flash results in the formation of a significant amount of glycols within the flash drum, since the hydrolysis rate of ethylene oxide in water at 75° and 110° C is about 0.2 percent per minute and about 2.4 percent per minute, respectively; operation of the stripping zone below atmospheric pressure greatly enhances the possibility of drawing air into the system, thus increasing the risk of forming potentially explosive mixtures; and compression of a gaseous stream containing a high concentration of ethylene oxide is, as indicated above, both economically unattractive and potentially hazardous.

Thus, a real and pressing need exists for the discovery of a method by which inert components, initially in admixture with ethylene oxide, may be substantially removed from such a mixture, without degradation of the epoxide or the inclusion of uneconomic or potentially unsafe processing steps.

BRIEF SUMMARY OF THE INVENTION

It has now been found that, in the separation of ethylene oxide from gaseous mixtures containing carbon dioxide, low molecular weight hydrocarbons and other inert materials, hydrolysis of ethylene oxide in the stripping zone may be minimized, the overall yield of ethylene oxide increased, and the entire recovery scheme operated without the necessity of compressing high concentration ethylene oxide streams, by (a) contacting the ethylene oxide-containing gaseous mixture in an absorption zone with a lean, aqueous absorbant to produce, as bottoms, an ethylene oxide-rich absorbate; (b) flashing the ethylene oxide-rich absorbate in an absorber bottoms flash zone at a temperature below about 65° C, to produce an inerts-lean condensate and (c) contacting, in an ethylene oxide stripping zone, the inerts-lean condensate with an aqueous vapor stream, at or slightly above atmospheric pressure, to produce a gaseous stripping zone overhead rich in ethylene oxide. In a preferred embodiment of the invention, the overhead product of the flash, an inerts-rich gaseous mixture, is subjected to at least one compression stage so as to recover the ethylene and ethylene oxide contained therein.

BRIEF DESCRIPTION OF THE DRAWING

The accompanying drawing diagrammatically illustrates a preferred embodiment of the invention. Shown therein are an absorption zone for recovering ethylene oxide from the oxidation reactor effluent; an absorber bottoms flash zone; a compression zone for recovering the ethylene and ethylene oxide overheaded in the absorber bottoms flash zone; and an ethylene oxide stripping zone. For the most part, nonessential pieces of equipment, such as pumps, surge vessels, accumulators and the like, have been omitted for purposes of clarity.

DETAILED DESCRIPTION OF THE INVENTION

The process of the present invention is particularly suitably applied to the effluent from an oxidation reactor in which ethylene and oxygen, under the influence of a silver catalyst, have combined to form ethylene oxide. The effluent from the oxidation reactor is generally at a pressure of about 150 to about 350 psia and a temperature of about 210° to 290° C. The effluent composition generally comprises about 0.5 to about 3%m ethylene oxide, up to about 35%m ethylene, as much as about 6%m oxygen, 0.5 to about 15%m carbon dioxide, and other inerts, such as nitrogen, argon, and low molecular weight hydrocarbons.

Such dilute ethylene oxide mixtures are cooled to a temperature of about 40° to about 90° C, and thereafter absorbed in an aqueous stream to separate the ethylene oxide from unreacted ethylene and oxygen, as well as other gaseous components of the oxidation reactor effluent which are nearly insoluble in aqueous media. Suitable absorption conditions maintained within the absorption zone are temperatures within the range of about 15° to about 50° C and pressures from about 100 to about 300 psia. The unabsorbed, gaseous materials, rich in ethylene, are suitable for recycle to the catalytic oxidation reactor.

This initially-produced aqueous absorbate, containing ethylene oxide in dilute concentration, i.e., generally less than about 1.5%m, together with some dissolved carbon dioxide and other gaseous inerts, passes to an absorber bottoms flash zone for removal of a substantial portion of the inert materials dissolved therein. In order to minimize the hydrolysis of ethylene oxide to glycols within the absorber bottoms flash zone, control of the temperature therein is essential. For instance, an aqueous absorbate at 100° C containing the indicated concentrations of ethylene oxide experience a 10 percent conversion of the epoxide to glycols in about eight minutes; at 75° C, 10 percent of the ethylene oxide in such an absorbate is hydrolyzed in about 45 minutes. Generally it has been found that if the flash of the absorption zone bottoms is effected at a temperature below about 65° C, the quantity of glycol formed permits more economical operation. At 35° C, for example, the extent of hydrolysis is negligible, amounting to ethylene oxide losses of about 0.005 and 0.05 percent for absorber bottoms flash zone residence times of 30 seconds and 5 minutes, respectively. Preferably, the flashing of the bottom product from the absorption zone is effected at a temperature of about 30° to about 50° C. Although not critical, the residence time of material within the absorber bottoms flash zone may be varied between about 20 seconds and 10 minutes.

Additional processing advantages accrue from flashing the absorption zone bottoms at a temperature below about 50° C. At such temperature levels the amount of ethylene oxide flashed from the fat absorbate is not large. Also, despite the relatively low temperature at which such a flash is carried out, a substantial portion of the inerts dissolved in the absorption zone bottoms are easily separated. The inerts content of the aqueous absorbates is typically reduced by at least 50 percent to about 85 percent. This has the considerable indirect advantage, as explained hereinafter, of facilitating the condensation of the stripping zone overhead product, thus avoiding the necessity of compressing this ethylene oxide-rich fraction.

By maintaining the indicated low temperatures within the absorber bottoms flash zone, the amount of ethylene oxide taken overhead is minimized. This permits a relatively clean separation between ethylene oxide and the inerts contained in the aqueous absorbate. As the overhead from the absorber bottoms flash zone is ultimately returned to the absorption zone, as hereinafter described, a low ethylene oxide content in such an overhead has the benefit of reducing the amount of lean aqueous absorbant required.

The pressure prevailing within the absorber bottoms flash zone will generally lie within the range of from about 15 to about 60 psia.

Material overheaded from the absorber bottoms flash zone contains, in addition to inerts, small but significant quantities of ethylene and ethylene oxide. Economics and the avoidance of environmental pollution dictate recovery of the last-named materials. In a preferred embodiment of the invention, this is conveniently accomplished by subjecting the inerts-rich gaseous overhead from the absorber bottoms flash zone to at least one stage which combines the sequential steps of compression, cooling, and separation of any resulting condensate. By "inerts-rich" is meant a gaseous process stream, produced as hereinabove described, which comprises at least 50%m carbon dioxide, $C_1$ and $C_2$ hydrocarbons, and fixed gases, and no more than about 25%m ethylene oxide. Such a sequence of processing steps permits essentially complete recovery of ethylene and ethylene oxide overheaded in the absorber bottoms flash zone. The selection of the number of stages of compression is determined by the overall compression ratio and the compression ratio attainable per stage. By compressing the overhead gaseous product from the absorber bottoms flash zone, rather than the stripping zone top product, as is common in the prior art, two substantial benefits result. First, a smaller volume of gas is being compressed for a given plant size, considerably reducing capital, maintenance, and operating expenses. Secondly, the lower concentration of ethylene oxide entering the suction side of the compressor substantially eliminates the potential hazards associated with prior art repressurizations of ethylene oxide-rich fractions.

Condensate from any subsequent separation step is returned to the absorber bottoms flash zone, while the corresponding vapor products after compression and cooling, are mixed with the effluent from the oxidation reactor and fed to the absorption zone.

Liquid from the absorber bottoms flash zone is passed to an ethylene oxide stripping zone for separation overhead of a gaseous fraction comprising a predominance of ethylene oxide and water, together with minor amounts of carbon dioxide and other gaseous inerts, from the liquid, aqueous bottoms fraction.

In an alternative processing sequence, the material overheaded from the absorber bottoms flash zone is contacted with an aqueous stream in a reabsorption zone. The gaseous product leaving the reabsorption zone is compressed and returned to the absorption zone. The ethylene oxide contained in the aqueous reabsorption zone bottoms is recovered, for example, by recycle to the absorber bottoms flash zone or by passage to the stripping zone. This variation reduces the volume, and the ethylene oxide content, of the gas to be compressed.

Prior partial removal of the inerts initially contained in the absorption zone bottoms permits condensation of the ethylene oxide stripping zone overhead at a pressure slightly above atmospheric. With conventional technology, this is difficult. In conventional processing, the overhead from the stripping zone, generally containing at least 25 mole percent ethylene oxide, and up to 80–90 mole percent ethylene oxide, must be compressed before condensation. Thus, flashing of the fat absorbate produced in the ethylene oxide absorption zone to remove a major proportion of the inert materials, avoids the necessity of compressing the potentially unstable, thermally- and pressure-sensitive ethylene oxide by allowing condensation at or about atmospheric pressure. In addition, condensation of the stripping zone overhead, at or slightly above atmospheric pressure, as allowed by the process of the present invention, enables the stripping zone to be operated under similar pressure conditions. This, in turn, greatly assists in minimizing the amount of glycols formed by hydrolysis therein.

Within the stripping zone, suitable stripping action may be obtained, for example, by injection of steam into the lower part thereof, under conditions resulting in the formation of an overhead consisting essentially of ethylene oxide and steam. Preferably, the pressure maintained within the stripping zone is at, or slightly above, atmospheric pressure, i.e., from about 15 to about 35 psia.

The bottom product from the stripping zone, comprising an essentially ethylene oxide-free aqueous stream, after being cooled is suitably recycled to the absorption zone, where it is employed to absorb ethylene oxide contained in additional gaseous oxidizer effluent. The gaseous overhead from the stripping zone is treated, by conventional means or otherwise, to recover therefrom the ethylene oxide as such or as an aqueous stream separated from the relatively minor proportion of impurities therein.

DETAILED DESCRIPTION OF THE DRAWING

A fuller understanding of the present invention may be obtained by reference to the accompanying drawing.

Referring to the drawing, a gaseous oxidizer effluent, such as that produced by the catalytic oxidation of ethylene over a silver catalyst, is charged to ethylene oxide absorption zone 10 through lines 11 and 15. An aqueous stream produced as hereinafter described is introduced into absorption zone 10 through line 12. In absorption zone 10, ethylene oxide together with small amounts of carbon dioxide and other gaseous inerts are absorbed in the aqueous phase. Nonabsorbed gases, usually comprising nitrogen, argon, oxygen, carbon dioxide, $C_1$ and $C_2$ hydrocarbons, and unreacted ethylene, are removed from absorption zone 10 through line 13, and are suitable for recycle to the catalytic oxidation reactor. The bottom product from the absorption zone, an aqueous stream containing ethylene oxide, passes through line 14 to absorber bottoms flash zone 20. In order to improve the heat economy of the recovery process, the gaseous oxidizer effluent may be cooled in heat exchanger 55 against the absorber bottoms flash zone liquid flowing in line 22.

Absorber bottoms flash zone 20 effects the removal of at least a major portion of the inert materials contained in stream 14. Generally, absorber bottoms flash zone 20 is maintained at a temperature below about 65° C, and at a pressure of about 15 to about 60 psia. Under these conditions a minimum of about 50 percent of the inerts contained in the ethylene oxide absorption zone bottoms are removed overhead. If the absorber bottoms flash zone is maintained at a temperature of about 35° C and a pressure of about 17 psia, only 1.7 percent of the ethylene oxide leaves in the vapor via line 23.

The overhead from absorber bottoms flash zone 20, flowing in line 23, contains small to moderate quantities of ethylene and ethylene oxide. Preferably, these materials are recovered, for instance, by at least one stage which comprises the steps of compression, cooling, and separation of any resulting condensate. As indicated in the drawing, one method of accomplishing this is to pass the overhead from absorber bottoms flash zone 20, flowing in line 23, to the suction side of compression zone 30, the discharge from which, flowing in line 31, is cooled in heat exchanger 32 prior to phase separation in separation zone 40. The number of compression zones and the intermediate pressures will be determined by the overall compression ratio required. Two compression zones, 30 and 50, are shown in the drawing; however, the number of such zones employed is not a critical aspect of the invention.

Condensate from the separation zone 40 contains some ethylene oxide, and may be recovered by passing it through lines 42 and 21 to absorber bottoms flash zone 20. The overhead from separation zone 40, flowing in line 43, is compressed in zone 50. The discharge from compression zone 50, flowing in line 51, may be cooled in heat exchanger 52. It is then mixed with additional oxidation reactor effluent flowing in line 11, and returned to absorption zone 10 through line 15. In this way, essentially all the ethylene dissolved in the aqueous absorbate from absorption zone 10 is ultimately returned thereto. If desired, the duty for heat exchanger zone 52 may be combined with that for zone 55 and zone 52 thus could be deleted.

The condensate from absorber bottoms flash zone 20, flowing in line 22, may sequentially exchange heat with the gaseous oxidizer effluent in heat exchanger 55, and the bottoms from the stripping zone in heat exchanger 60.

Ethylene oxide stripping zone 70 effects a recovery of 99.0%+ of the entering ethylene oxide. To any losses of ethylene oxide which occur during the course of the stripping operation must be added the loss of ethylene oxide by hydration to ethylene glycol, diethylene glycol, and higher glycols. Since a considerable portion of the inerts contained in the bottom product from the ethylene oxide absorption zone 10 have been removed in absorber bottoms flash zone 20, the overhead product from stripping zone 70, flowing in line 72, may be condensed at or slightly above atmospheric pressure by indirect heat exchange with ordinary cooling water. This, in turn, permits the pressure in the stripping zone to be maintained at about 15 to about 35 psia. The pressure maintained within stripping zone 70 is set at the minimum practical value which will insure positive pressure on the system and permit recovery of the ethylene oxide by condensation or other alternative schemes. Heat for stripping in zone 70 may be supplied by the use of conventional reboilers, open steam admitted thereto via line 71, or any combination thereof. The small amount of glycols formed in the stripping zone may be withdrawn therefrom through a slip-stream, not shown on the drawing.

EXAMPLE

One hundred moles per hour of a gaseous stream, produced by the silver-catalyzed oxidation of ethylene and containing approximately 1.6%m. ethylene oxide, is fed to the process shown in the accompanying drawing. Approximate temperatures and pressures maintained in various items of equipment are indicated in Table I. Under the indicated conditions, approximately 80 percent of the inerts, and only about 2 percent of the ethylene oxide in the feed to absorber bottoms flash zone 20 are taken overhead. Thus, the amount of inerts remaining in stream 72 is reduced by a factor of about 5. Approximate molar compositions, flows, and temperatures of selected process streams are shown in Table II.

TABLE I

Approximate Equipment Conditions

| Equipment Item | Pressure, psia | Temperatures, °C Top | Average | Bottom |
|---|---|---|---|---|
| Absorption Zone 10 | 260. | 25 | — | 60 |
| Absorber Bottoms Flash Zone 20 | 16.7 | — | 35 | — |
| Stripping Zone 70 | 23 | 100 | — | 114 |

TABLE II

Approximate Flows, Temperatures, and Molar Compositions (Percent) of Various Process Streams

| Stream | 12 | 13 | 14 | 51 | 72 |
|---|---|---|---|---|---|
| Flow, moles/hr | 170 | 97 | 173 | 0.002 | 6.1 |
| Temp., °C. | 25 | 25 | 35 | 130 | 92 |
| Composition | | | | | |
| Inerts | — | 26.8 | Trace | 5.7 | Trace |
| $CH_4$ | — | 39.3 | — | 10.5 | 0.1 |
| $C_2H_4$ | — | 34.1 | Trace | 34.3 | 0.1 |
| $C_2H_6$ | — | 3.9 | — | 1.3 | Trace |
| $CO_2$ | — | 5.7 | Trace | 29.5 | 0.5 |
| Ethylene Oxide | — | — | 1.0 | 13.9 | 27.6 |
| Water | 98.5 | 0.2 | 97.5 | 4.8 | 71.7 |
| Ethylene Glycol | 1.5 | — | 1.5 | — | — |

We claim as our invention:

1. A process for recovering ethylene oxide from gaseous mixture comprising ethylene oxide and inerts, including $C_1$ and $C_2$ hydrocarbons, oxides of carbon, and fixed gases, whereby the formation of glycols by hydrolysis is minimized and the necessity of compressing gaseous streams containing high concentrations of ethylene oxide is avoided, which comprises
    a. contacting, in an absorption zone, said gaseous mixture with a lean, aqueous absorbant, thereby producing, as bottoms, an ethylene oxide-rich absorbate;
    b. flashing, in an absorber bottoms flash zone, at a temperature from about 30° to about 50° C and a pressure of about 15 to about 60 psia, the ethylene oxide-rich absorbate, thereby producing an inerts-lean liquid and an inerts-rich gaseous overhead containing at least 50 percent of the inerts present in the ethylene oxide rich absorbate;
    c. contacting, in an ethylene oxide stripping zone, the inerts-lean liquid with stripping stream, at or slightly above atmospheric pressure, thereby producing a gaseous stripping zone overhead rich in ethylene oxide.

2. The process of claim 1 wherein the inerts-rich, gaseous overhead is compressed and recycled back to the absorption zone, thereby recovering ethylene and ethylene oxide contained therein.

3. The process of claim 2 wherein the condensate resulting from cooling of the compressed gaseous overhead is recycled to the absorber bottoms flash zone.

4. The process of claim 1 wherein the residence time of material within the absorber bottoms flash zone is about 20 seconds to about 10 minutes.

5. The process of claim 1 wherein the stripping zone is maintained at a pressure of about 15 to about 35 psia.

6. The process of claim 1 wherein the gaseous stripping zone overhead is condensed by indirect heat exchange with ordinary cooling water.

* * * * *